United States Patent [19]

Williams et al.

[11] Patent Number: 5,254,318
[45] Date of Patent: Oct. 19, 1993

[54] LINED REFORMER TUBES FOR HIGH PRESSURE REFORMER REACTORS

[75] Inventors: Joseph J. Williams, Sudbury; Robert A. Rosenberg, Dover; Lane J. McDonough, Natick, all of Mass.

[73] Assignee: Stone & Webster Engineering Corporation, Boston, Mass.

[21] Appl. No.: 916,366

[22] Filed: Jul. 20, 1992

[51] Int. Cl.$^5$ .............................................. B01J 08/04
[52] U.S. Cl. .................................. 422/197; 422/240; 422/241
[58] Field of Search .................. 422/197, 240, 241; 208/130

[56] References Cited

U.S. PATENT DOCUMENTS

| | | | |
|---|---|---|---|
| 3,719,519 | 3/1973 | Perugini | 422/241 |
| 3,958,951 | 5/1976 | Woebcke et al. | 422/197 |
| 4,221,763 | 9/1980 | Greene | 422/241 |
| 4,325,926 | 4/1982 | Worley | 422/197 |
| 4,440,727 | 4/1984 | Bruck | 422/197 |
| 4,444,731 | 4/1984 | Konoki et al. | 422/241 |
| 4,500,730 | 2/1985 | Tanaka et al. | 422/241 |
| 4,554,135 | 11/1985 | Grotz et al. | 422/240 |
| 4,559,207 | 12/1985 | Hiller et al. | 422/241 |
| 4,642,864 | 2/1987 | Metcalfe et al. | 29/157.3 R |
| 4,661,323 | 4/1987 | Olesen | 422/197 |
| 4,692,313 | 9/1987 | Watanabe et al. | 422/241 |
| 4,780,196 | 10/1988 | Alagy et al. | 422/197 |
| 4,820,472 | 3/1989 | Andrew et al. | 422/197 |
| 4,824,658 | 4/1989 | Karafian et al. | 422/197 |
| 4,904,455 | 2/1990 | Karafian et al. | 423/652 |
| 4,926,001 | 5/1990 | Alagy et al. | 585/500 |
| 4,971,770 | 11/1990 | Alagy et al. | 422/191 |
| 4,973,777 | 11/1990 | Alagy et al. | 585/403 |
| 5,032,365 | 7/1991 | Aono et al. | 422/197 |
| 5,037,619 | 8/1991 | Alagy et al. | 422/196 |

FOREIGN PATENT DOCUMENTS

| | | |
|---|---|---|
| 0418122A | 3/1991 | European Pat. Off. . |
| 2589859A | 5/1987 | France . |
| 2637059A | 3/1990 | France . |
| 2637060A | 3/1990 | France . |
| 2640620A | 12/1990 | France . |
| 2648471A | 12/1990 | France . |
| 2484055A | 12/1991 | France . |

Primary Examiner—Robert J. Warden
Assistant Examiner—Hien Tran
Attorney, Agent, or Firm—Hedman, Gibson & Costigan

[57] ABSTRACT

A reformer tube assembly for use in reformer reactors including a ceramic tube having an open top end and a closed bottom end, a corrosive resistant liner for the ceramic tube also having an open top end and closed bottom end and a centrally disposed metal tube having an open top end and open bottom end wherein the centrally disposed metal tube has a diameter substantially less than the liner so as to form an annulus between the interior of the liner and the exterior of the centrally disposed tube in which catalyst for the reaction is placed, and the open bottom end of the centrally disposed tube is spaced away from the closed bottom of the liner to allow process gas exiting the catalyst filled annulus to pass along the closed bottom of the liner and up the interior of the centrally disposed metal tube.

36 Claims, 6 Drawing Sheets

LINED REFORMER TUBES FOR HIGH PRESSURE REFORMER REACTORS

FIELD OF THE INVENTION

The present invention relates to steam reformer furnaces for producing hydrogen rich or synthesis gas. More specifically it relates to reformer tubes used in reformer furnaces.

BACKGROUND OF THE INVENTION

Convective reformer furnaces have long been used for catalytic gas reactions including the production of hydrogen rich or synthesis gases. The basic design for such reformers can be found in U.S. Pat. No. 3,958,951 dated May 25, 1976.

Basically, a reformer utilizes an external combustion chamber having burners to produce high temperature flue gas for providing heat to a series of process or reformer tubes in an assembly including a tube sheet attached to the tubes and so mounted to retain the tubes in the furnace. The reformer tubes generally contain catalyst disposed in a portion of the tube through which the feed gases are passed for reaction. In the mid to late 1980's the use of ceramic tubes in convective reformers became well known.

The U.S. Pat. No. 3,958,951, cited above, utilizes reformer tubes open at both ends and having a central section for containment of the catalyst, the product gases being passed into a central tube for removal. However, development of the reformer furnace led to the use of bayonet tubes, closed at one end and open at the other end, as generally shown in U.S. Pat. No. 4,810,472 dated Mar. 7, 1989.

The reformer tubes currently known in the art, however, have not been completely reliable when dealing with a system utilizing high pressure and high temperature. It is therefore an object of the present invention to provide an improved reformer tube for use with steam reforming in convective reformers under high temperature and pressure.

SUMMARY OF THE INVENTION

This and other objects are achieved by the steam/methane reformer tube assembly of the present invention for use in convective reformer reactors having feed gas inlet means, product gas outlet means, a plurality of reformer tubes cooperating with said inlet and outlet means, and means for supplying a heating medium to the exterior of the reformer tubes, said reformer tubes comprising a ceramic tube having an inner diameter, an outer diameter, an open top end, a closed bottom end and means for support attached essentially at said open end, a corrosion resistant liner having an inner diameter, an outer diameter which is essentially the same diameter as the inner diameter of the ceramic tube at operating temperature, an open top end, a closed bottom end, and a centrally disposed metal tube having an inner diameter, an outer diameter, an open top end, an open bottom end and means for support attached essentially at the open top end wherein the open bottom end of the centrally disposed metal tube does not touch the bottom closed end of the liner and further wherein the centrally disposed metal tube has an outer diameter substantially less than the inner diameter of the liner thereby forming an annulus therebetween in which a catalyst is disposed such that during operation feed gas is introduced to the catalyst between the liner and the centrally disposed metal tube for reaction to form product gases which pass between the bottom open end of the centrally disposed metal tube and the closed bottom end of the liner and are removed up the inside of the centrally disposed metal tube and out of the reformer reactor through the product gas outlet.

The liner of the present invention is in the form of a metal or non-metal coating on the interior of the ceramic tube or an independent metal liner tube which has an outer diameter that is less than the inner diameter of the ceramic tube at room temperature but essentially the same as the inner diameter of the ceramic tube at operating temperature.

The present invention provides a corrosion barrier between the ceramic tube and the constituents within the process gases, most notably steam, which tend to corrode the ceramic.

Furthermore, a synergistic effect is found between the use of the ceramic tube and liner. The ceramic tube provides structural strength, integrity and thermal characteristics necessary to perform a reforming process at higher temperatures of about 2300° F. and greater, where most metals would not be useful, resulting in higher efficiencies. The liner provides corrosion resistance not found in the preferred ceramic material. Additionally, the reforming process can proceed at a high pressure differential across the wall of the ceramic tube and liner, i.e. $\Delta P$ in the order of 600 psi or greater.

DESCRIPTION OF THE DRAWINGS

The attached drawing figures, in which like reference characters represent like parts, are intended to illustrate the invention for a better understanding thereof. The embodiments shown are not intended to limit the invention in any manner whatsoever.

DETAILED DESCRIPTION OF THE INVENTION

Figure 1:
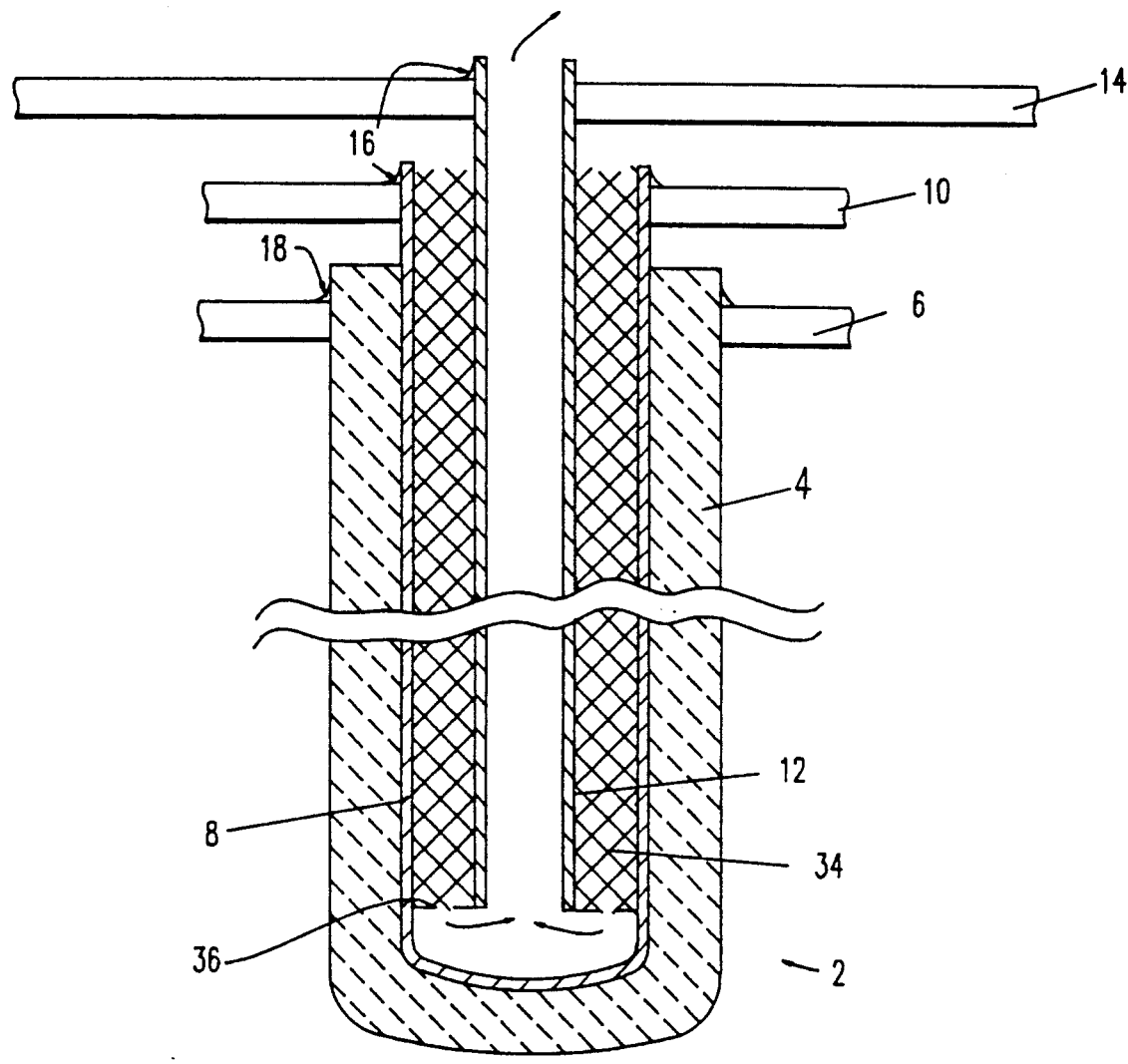
FIG. 1 is a cross-sectional elevation of the reformer tube of the present invention using a metal liner tube.
Figure 4:
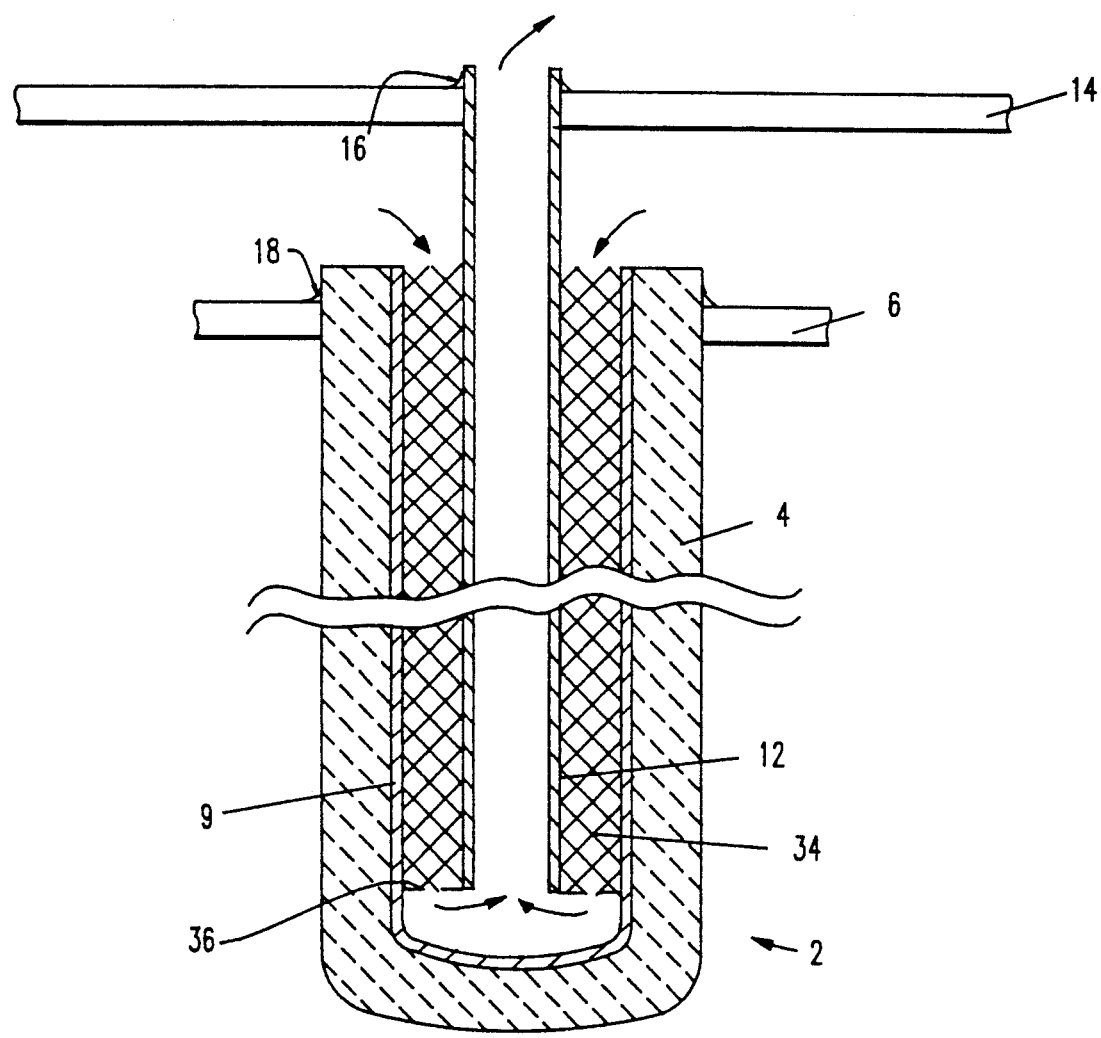
FIG. 4 is a cross-sectional elevation of the reformer tube of the present invention using a corrosion resistant metal or non-metal coating.

The reformer tube 2 of the present invention seen in FIG. 1 comprises a ceramic tube 4 supported at its open end by a lower tube sheet 6, a metal liner tube 8 supported by a middle tube sheet 10 and a centrally disposed tube 12 open at both ends and supported by an upper tube sheet 14. Alternatively, as seen in FIG. 4, the ceramic tube 4 has a metal or non-metal coating 9 on the interior thereof eliminating the need for the middle tube sheet 10.

The tube sheets 6, 10 (when used) and 14 are preferably metal, as is the central tube 12. The central tube 12 and the metal liner tube 8 are preferably attached to the metal upper and middle tube sheets 14 and 10, respectively, by perimeter welds 16 to form a gas impermeable seal. Similarly, the ceramic tube 4 is attached to the metal lower tube sheet 6 by a ceramic/metal joint 18 about the perimeter of the ceramic tube 4 to form a gas impermeable seal, as generally described in U.S. Pat. No. 4,642,864.

Figure 1A:
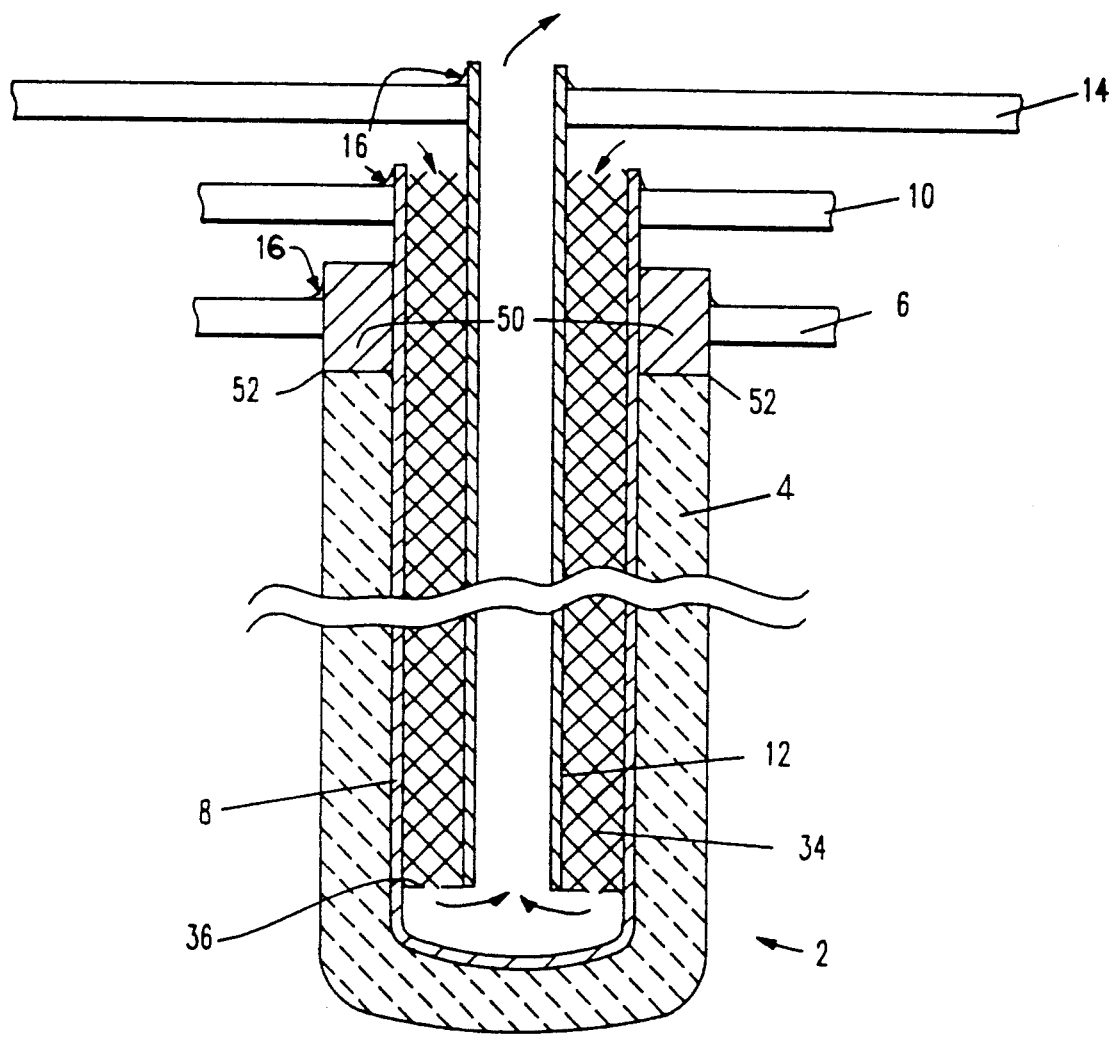
FIG. 1A is a cross-sectional elevation of an alternative embodiment of the reformer tube of the present invention using a metal tube liner having a metal end on the ceramic tube for connection to the support means.
Figure 4A:
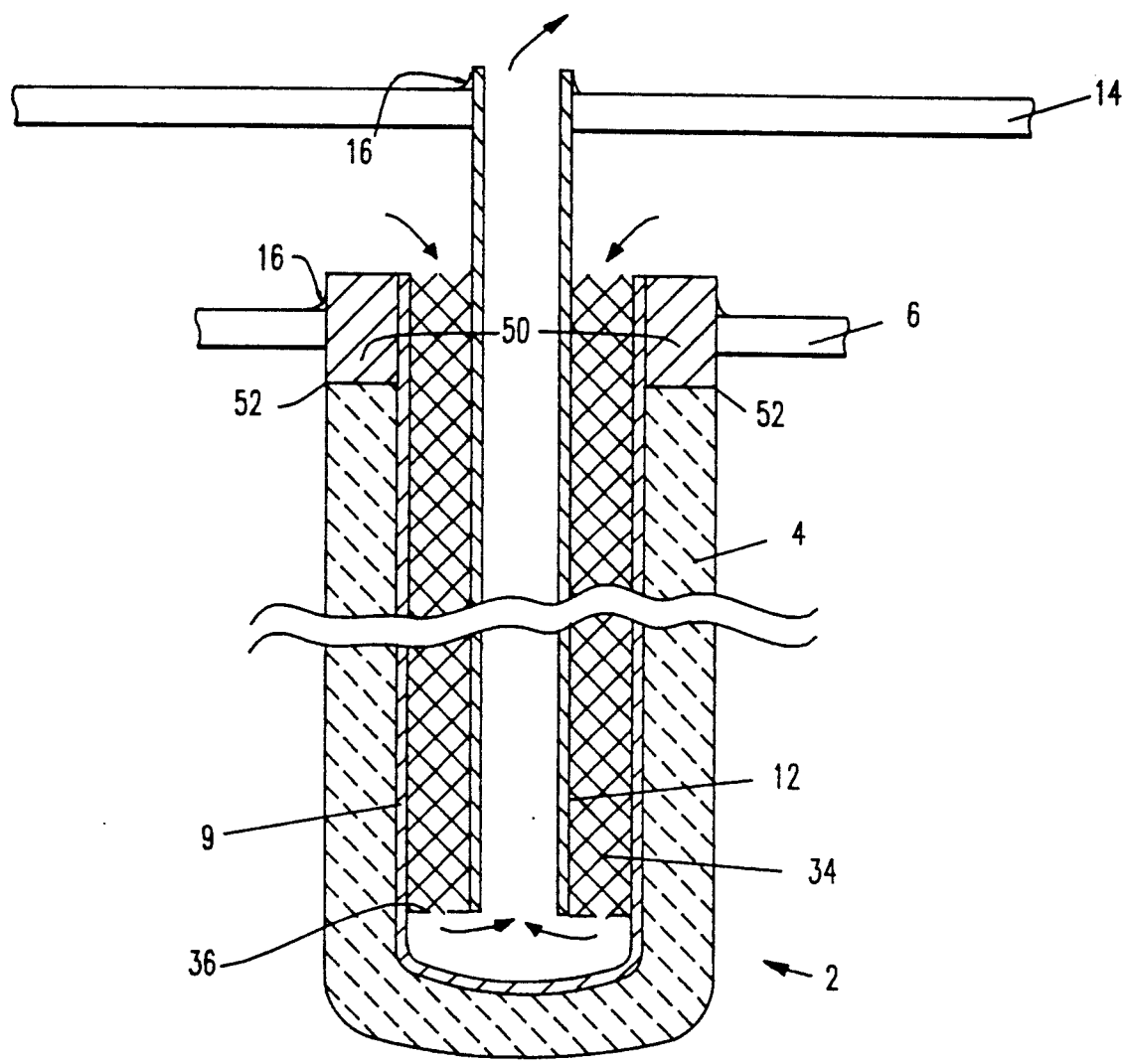
FIG. 4A is a cross-sectional elevation of an alternative embodiment of the reformer tube of the present invention using a corrosion resistant metal or non-metal coating having a metal end on the ceramic tube for connection to the support means.

Another alternative, as shown in FIGS. 1A and 4A, utilizes a ceramic tube 4 which terminates in a metal end 50 of equal diameter to the ceramic tube 4. The metal end 50 is attached to the lower tube sheet 6 by a weld 16 rather than necessitating the use of a ceramic metal joint 18 about the outer diameter of the ceramic tube 4 at the lower tube sheet 6. The metal end 50 is attached to the ceramic portion of the ceramic tube 4 preferably using a ceramic metal joint in the form of a butt joint 52, as being developed by DuPont Lanxide, Inc.

The structure of the present invention is most preferred wherein the ceramic tube 4, the liner tube 8 (when used) and the centrally disposed metal tube 12 are fixed at only one point, i.e. at the support means comprising tube sheets 6, 10 (when used) and 14, allowing for limited movement during temperature changes and operation. Further, the support means at which the components are fixed are at the coolest point of the reformer reactor, limiting extreme conditions which could lead to failure.

The ceramic tube 4, metal liner tube 8 or coating 9, central tube 12, as well as the tube sheets 6, 10 and 14, welds 16 and joints 18 are capable of maintaining an internal pressure of at least 600 psig at operating temperatures, with operating pressures of 50 to 600 psig, and preferably 120 to 300 psig contemplated.

The ceramic tube 4 is closed at the bottom and is preferably made from alpha silicon carbide, such as HEXOLOY SA available from Carborundum, Inc., but can also be made from composite materials based on silicon carbide, including composites made from the Lanxide DIMOX process available from DuPont Lanxide, Inc., reaction bonded silicon carbide, silicon nitride, alumina or alumina/silicon carbide composites. The outer diameter (o.d.) of the ceramic tube 4 is preferably from about $2\frac{1}{2}''$ to about 6" and most preferably about $3\frac{1}{2}''$ with the inner diameter (i.d.) being from about $\frac{1}{4}''$ to about 2" less than the o.d., the i.d. most preferred being about 3" when the o.d. is about $3\frac{1}{2}''$. The length of the ceramic tube 4 is preferably from about 20 to about 40 feet.

Figure 3:
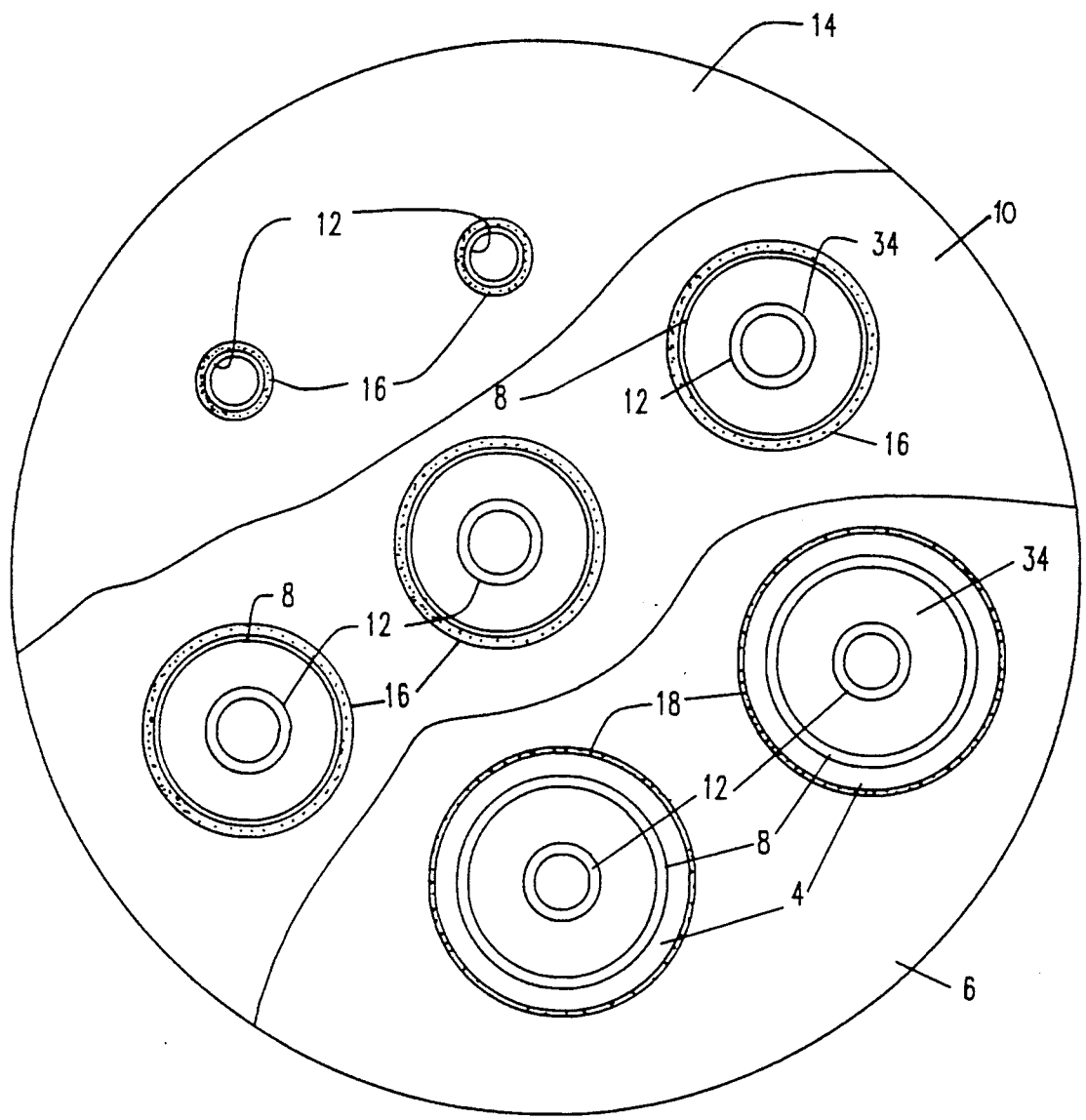
FIG. 3 is a cut-away plan view of the preferred tube sheets supporting the reformer tubes of FIG. 1.

The thickness of the metal liner tube 8 shown in FIGS. 1 and 1A is preferably in the range of from about 0.05 to about 0.125 inches along the sides and the closed bottom. As shown in FIGS. 1 and 1A, the open top of the metal liner tube 8 preferably extends beyond the open top of the ceramic tube 4 and is engaged by a middle tube sheet 10, sealed about its perimeter by a weld 16 as shown in FIGS. 1 and 3.

The metal liner tube 8 is preferably made of nickel, INCOLOY 800HT available from Inco International, types 304H or 316H stainless steel, alloys, or any other suitable metal which acts as a barrier to corrosion by the constituents of the process gas flowing therein. The metal liner tube 8 of FIGS. 1 and 1A has an o.d. slightly less than the i.d. of the ceramic tube 4 at room temperature, leaving a small space between the i.d. of the ceramic tube 4 and the o.d. of the metal liner tube 8 to allow the metal liner tube 8 to expand during heating. When the temperature of the reformer tube 2 is increased to its operating temperature, the diameter of the metal liner tube 8 will expand more than the diameter of the ceramic tube 4 and the o.d. of the metal liner tube 8 will generally contact the i.d. of the ceramic tube 4.

The metal or non-metal coating 9 shown in FIGS. 4 and 4A is a flash coating of from about 0.0005 to about 0.001 inch thick at the walls and across the bottom of the interior of the ceramic tube 4. Since the coating 9 is applied to the ceramic tube 4, there is no need for separate support means such as the middle tube sheet 10, used in the embodiment shown in FIGS. 1 and 1A. Additionally, since the coating 9 is so thin, expansion of the metal coating over that of the ceramic tube 4 is not a concern.

Although the coating 9 is shown to reach the open end of the ceramic tube in FIGS. 4 and 4A it is understood that the coating can go over the open end in FIG. 4 and need go only beyond the ceramic/metal butt joint 52 in FIG. 4A to provide the necessary corrosion resistance.

The coating 9 is made of a corrosion resistant metal or non-metal. For a metal coating, the metals listed above for the metal liner tube 8 are also preferred for use as the coating 9. The metal coating 9 is applied to the interior of the ceramic tube 4 using a plasma spray, or most preferably by electroless nickel coating when a nickel coating is desired.

Non-metals preferred for use as the coating 9 include aluminas, alumina nitride, zirconia and ceramic materials which are more corrosive resistant in the operating environment than the ceramic tube 4, depending on the desired reaction. These non-metals are applied by plasma spray or by slip or gel casting in the ceramic tube 4.

The central tube 12 is made of a metal or metal alloy and is preferably formed of nickel, INCONEL 617, INCOLOY 800H or INCOLOY 800HT, each available from Inco International, with INCOLOY 800HT being most preferred. The o.d. of the central tube 12 is substantially less than the i.d. of the liner 8 or 9, thereby forming an annulus 34 between the inside of the liner 8 or 9 and the outside of the central tube 12. The annulus 34 is packed with catalyst for the reaction, suspended upon a grid 36 which extends between the interior of the metal liner 8 and the outside of the central tube 12 in close proximity to the bottom open end of the central tube 12.

Any catalyst in particulate form may be used, depending on the desired results of the reaction. The typical catalyst for steam-methane reforming is a nickel based catalyst on an alumina substrate. The holes of the grid 36 should be sized smaller than the catalyst particles which range from about $\frac{1}{4}$ to about $\frac{3}{8}$ inch across.

The central tube 12 is placed within the liner 8 or 9 of the reformer tube 2 so that the bottom open end of the central tube 12 does not touch the bottom closed end of the liner 8 or 9. The opening between the bottom open end of the central tube 12 and inside closed end of the liner 8 or 9 allows process gases to exit the catalyst bed in the annulus 34 and pass to the interior of the central tube 12 for removal to the product gas outlet 26. In practice, the space between the open bottom of the central tube 12 and the closed bottom of the liner 8 or 9 is maintained as a certain dimension during operation of the reformer 20.

Preferably, the space between the open bottom end of the central tube 12 and interior of the closed bottom end of the liner 8 or 9 is approximately equal to the width of the annulus between the exterior of one side of the central tube 12 and its cooperating interior side of the liner 8 or 9. Therefore, using the preferred dimensions wherein the ceramic tube 4 has a $3\frac{1}{2}''$ o.d. and a 3'' i.d., the liner 8 or 9 is less than approximately 0.1 inch thick, and the central tube 12 has a 1'' o.d., the space between the open bottom end of the central tube 12 and the interior surface of the closed bottom end of the liner 8 or 9 is in the range of from about $\frac{1}{2}$ inch to about 6 inches and is most preferably about 1 inch.

As stated above, the tube sheets 6, 10 and 14 are preferably metal with type 304H or 316H stainless steel or INCOLOY 800H for tube sheet 6, type 304H stainless steel or $2\frac{1}{4}$ Cr-1 Mo steel for tube sheet 10 (when used) and $2\frac{1}{4}$ Cr-1 Mo or $1\frac{1}{4}$ Cr-0.5 Mo steel for tube sheet 14, or equivalents, being most preferred. The distance between the lower tube sheet 6 and the middle tube sheet 10 in FIGS. 1 and 1A need not be any specific distance but is preferably from about 1 to about 3 feet when using reformer tubes 2 of a preferred length, utilizing ceramic tubes 4 having a length of from about 20 to about 40 feet. The distance from the middle tube sheet 10 to the upper tube sheet 14 in FIGS. 1 and 1A is wide enough to allow catalyst loading and unloading as well as unrestricted feed gas flow to the annulus 34, and is preferably from about 3 to about 6 feet. When a coating 9 is used rather than the metal liner tube 8, as shown in FIGS. 4 and 4A, the middle tube sheet 10 is not used and the distance between the upper sheet 14 and lower tube sheet 6 is preferably from about 3 to about 6 feet, again to allow catalyst loading and the unrestricted feed gas flow.

Figure 2:
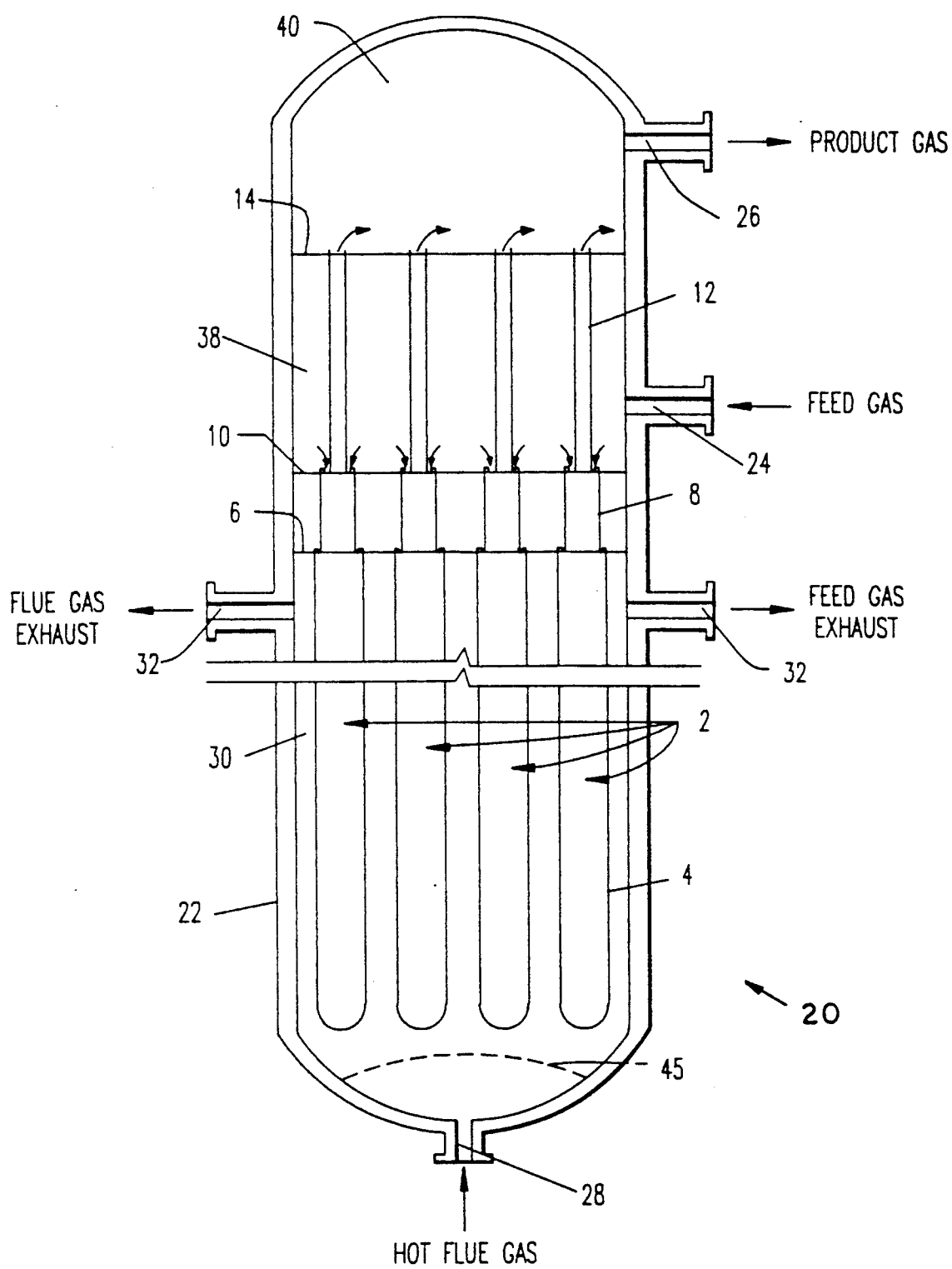
FIG. 2 is a cut-away elevation of a convective reformer reactor in which the reformer tubes of FIG. 1 are shown.

The reformer tubes 2 of the present invention are intended for use with any compatible reformer reactor. A generic representation of a reformer reactor 20 contemplated for use with the reformer tubes hereof is shown in FIG. 2. The reactor 20 basically comprises a shell 22 having a feed gas inlet 24, a product gas outlet 26, an inlet 28 at the bottom of the reactor 20 for the heating medium, i.e. hot flue gas, to enter a heated section 30 through a perforated flue gas distributor 45 and one or more flue gas exhausts 32. The heated section 30 defined at the bottom by the distributor 45 and the top by the lower tube sheet 6 is where essentially all of the length of the ceramic tubes 4 of the reformer tubes 2 are located. Flue gas exhausts 32, located at or near the top of the heated section 30, remove the heating medium after it has transferred at least a portion of its heat to the reformer tubes 2, thereby providing the heat of reaction.

To withstand the heat of the hot flue gas entering heated section 30, the perforated distributor 45 is preferably made of a ceramic material such as those listed for use in the ceramic tube 4.

During operation in the most preferred embodiment, feed gas is introduced into the reformer 20 through inlet 24 into the chamber 38 defined by the bottom of the upper tube sheet 14 and the top of middle tube sheet 10 in FIGS. 1 and 1A, or the top of the lower tube sheet 6 in FIGS. 4 and 4A, at a constant pressure of about from about 50 to about 600 psig, and most preferably at from about 120 to about 300 psig.

Feed gas in chamber 38 is passed down through the catalyst bed in annulus 34 where it is heated and reacts with the aid of the catalyst to form the product gas. The heat provided for the reaction comes from hot flue gas, externally generated at pressure, fed into chamber 30 through the bottom heating medium inlet 28 of the reactor 20, or internally generated as described in U.S. Pat. No. 3,958,951. The hot flue gas flows through the perforated gas distributor 45 upward, counter-current to the process gas in the catalyst filled annulus 34 and, after a portion of the heat of the flue gas has been removed, exits at or near the top of heated section 30 and out of the reformer 20 through flue gas outlets 32.

The reforming operation is generally carried out using hot flue gas entering the heated section 30 at temperatures of about 2300° F. or higher. The pressure of the heating medium can be any suitable pressure but is preferably from about 120 psig to a pressure equal to that of the feed on the interior of the tube, i.e. 300 psig in this example. As the hot flue gas passes over the reformer tubes 2 and transfers heat to the tubes 2, the temperature drops to temperatures from about 1050° F. to about 1500° F. by the time it exits heated section 30. The temperature drop depends at least in part to the length of the tubes 2 wherein when the tubes are shorter, the exiting flue gas temperature is higher, requiring higher temperature seals and components.

Although the o.d. of the metal liner tube 8 shown in FIGS. 1 and 1A does not contact the i.d. of the ceramic tube 4 at room temperature, at the operating temperature the o.d. of the metal liner tube 8 generally makes contact with the i.d. of the ceramic tube 4 because the ceramic does not expand as much as the metal when heated to operating temperature. Therefore, at the operating temperature the o.d. of the metal liner tube 8 is substantially the same as, and generally contacts, the i.d. of the ceramic tube 4.

Of course, the metal or non-metal coating 9 shown in FIGS. 4 and 4A is always in contact with the ceramic tube 4.

The central tube 12 is preferred to have an o.d. of about 1'' under the above parameters, and, as such, the catalyst filled annulus 34 between the outer wall of the central tube 12 and the inner wall of the liner 8 or 9 is preferably maintained at about 1'' during operation.

The process gas, having passed through the catalyst bed in annulus 34 and across grid 36, changes direction at the closed end of the liner 8 or 9, around the open bottom end of the central tube 12, and proceeds up the central tube 12. The product gas then exits the open top end of the central tube 12, above the upper tube sheet 14, into the chamber 40 and out the product gas outlet 26.

The pressure of the feed gas entering the annulus 34 is usually greater than the pressure on the outside of the ceramic tube 4, and is maintained throughout the reforming operation. For example, the pressure of the feed gas would be 300 psig and the pressure of the heating medium on the outside of the ceramic tube 4 would be 120 psig. However, operation with essentially equal pressure on the inside and outside of the ceramic tube 4, or any amount in between, is a suitable alternative.

At the feed gas pressure and dimensions of the preferred embodiment set forth above, the reaction time of the process, i.e. from when the feed gas enters the annulus 34, thereby contacting the catalyst under high temperatures, to when the product gas exits the annulus 34 is about 2 seconds. The hot product gas, at a temperature of about 1900° F., passes up the central tube 12 and is cooled as it transfers heat to the annulus 34.

The higher processing temperatures achievable using ceramics result in nearly complete, i.e. over 99%, conversion of the methane feed gas compared to only abut 85% conversion in conventional reformers limited by the upper temperature limits of metal tubes. The ceramic wall temperature can approach 2300° F. (using 2300° F. flue gas), allowing process outlet temperatures at the bottom of the annulus 34 of about 1900° F. In comparison, state of the art metal tubes are limited to about 1850° F. wall temperatures, at reforming conditions, and allow processing temperatures of only about 1600° F.

Although the present invention has been described in its preferred embodiment, all variations obvious to one skilled in the art are intended to fall within the spirit and scope of the invention, limited only by the appended claims. All patents cited herein are hereby incorporated by reference.

We claim:

1. A reformer tube assembly for use in convective reformer reactors having feed gas inlet means, product gas outlet means, a plurality of reformer tubes cooperating with said inlet and outlet means, and means for supplying a heating medium to an exterior portion of the reformer tubes, said reformer tubes comprising a ceramic tube, a portion of which is exposed to a feed or process gas, having an interior and an inner diameter, an exterior and an outer diameter, an open top end, a closed bottom end and a means for support attached adjacent to said open top end, a corrosion resistant liner, conforming to the entire portion of the interior of the ceramic tube exposed to the feed or process gas, said corrosion resistant liner having an inner diameter, an outer diameter equal to the inner diameter of the ceramic tube at operating temperature, an open top end and a closed bottom end, and a centrally disposed metal tube having an interior, an exterior, an open top end, an open bottom end and a means for support attached adjacent to the open top end of the centrally disposed metal tube wherein there is a space between the open bottom end of the centrally disposed metal tube and the bottom closed end of the corrosion resistant liner and further wherein the centrally disposed metal tube has an outer diameter less than the inner diameter of the corrosion resistant liner thereby forming an annulus therebetween for disposition of a catalyst whereby during operation feed gas is introduced to the catalyst in the annulus between the corrosion resistant liner and the centrally disposed metal tube for reaction to form product gases which pass between the open bottom end of the centrally disposed metal tube and the closed bottom end of the corrosion resistant liner and are removed up through the interior of the centrally disposed metal tube and out of the reformer reactor through the product gas outlet.

2. The reformer tube assembly of claim 1 wherein the ceramic tube is made from a material taken from the group consisting of alpha silicon carbide, reaction bonded silicon carbide, silicon nitride, alumina, alumina/silicon carbide composites and composites based on silicon carbide.

3. The reformer tube assembly of claim 1 wherein the ceramic tube has an outer diameter of about $3\frac{1}{2}"$, an inner diameter of about 3" and a length of from about 20 to about 40 feet.

4. The reformer tube assembly of claim 1 wherein the open end of the ceramic tube further comprises a metal end for attachment to the means of support.

5. The reformer tube assembly of claim 1 wherein the corrosion resistant liner comprises a metal liner tube having an outer diameter which is less than the inner diameter of the ceramic tube at room temperature and wherein the open top end of the metal liner tube extends a distance intermediate the open top end of the ceramic tube and the top open end of the centrally disposed metal tube and further comprises means for support attached adjacent to the open end of the metal liner tube.

6. The reformer tube assembly of claim 5 wherein the metal liner tube is made of a material taken from the group consisting of nickel, INCOLOY 800HT, type 304H stainless steel and type 316H stainless steel.

7. The reformer tube assembly of claim 6 wherein the metal liner tube has a thickness of about 0.05 to about 0.125 inches.

8. The reformer tube assembly of claim 1 wherein the corrosion resistant liner comprises a metal coating on the interior of the ceramic tube.

9. The reformer tube assembly of claim 8 wherein the metal coating is made from a metal taken from the group consisting of nickel, INCOLOY 800HT, type 304H stainless steel and type 316H stainless steel.

10. The reformer tube assembly of claim 8 wherein the metal coating has a thickness of from about 0.0005 to about 0.001 inch.

11. The reformer tube assembly of claim 1 wherein the corrosion resistant liner comprises a non-metal coating on the interior of ceramic tube.

12. The reformer tube assembly of claim 11 wherein the non-metal coating is taken from the group consisting of aluminas, alumina nitride, zirconia, ceramics, and ceramic composites.

13. The reformer tube assembly of claim 11 wherein the non-metal coating has a thickness of from about 0.0005 to about 0.001 inch.

14. The reformer tube assembly of claim 1 wherein the centrally disposed metal tube is made of a metal alloy taken from the group consisting of INCONEL 617, INCOLOY 800H and INCOLOY 800HT.

15. The reformer tube assembly of claim 1 wherein the centrally disposed metal tube has an outer diameter of about 1".

16. The reformer tube assembly of claim 15 wherein the space between the open bottom end of the centrally disposed metal tube and the closed bottom end of the corrosion resistant liner is maintained at from about $\frac{1}{2}"$ to about 6" during operation.

17. The reformer tube assembly of claim 1 wherein the open top end of the centrally disposed metal tube extends above the open top end of the ceramic tube.

18. The reformer tube assembly of claim 1 wherein the means to support the centrally disposed metal tube is an upper tube sheet sealed around an outer perimeter of the centrally disposed metal tube.

19. The reformer tube assembly of claim 18 wherein the upper tube sheet is made of a metal taken from the group consisting of $2\frac{1}{4}$ Cr-1 Mo steel and $1\frac{1}{4}$ Cr-0.5 Mo steel.

20. The reformer tube assembly of claim 19 wherein the upper tube sheet is sealed to the outer perimeter of the centrally disposed metal tube with a weld.

21. The reformer tube assembly of claim 18 further comprising a contained outlet chamber above the upper tube sheet, said chamber being in flow communication with the interior of the centrally disposed metal tubes from which product gases emerge and a product gas outlet means on a reformer reactor to which the reformer tube assembly is fitted from which product gases exit the reformer reactor.

22. The reformer tube assembly of claim 5 wherein the means to support the metal liner tube comprises a middle tube sheet sealed about an outer perimeter of the metal liner tube.

23. The reformer tube assembly of claim 22 wherein the middle tube sheet is made of a metal taken from the group consisting of type 304 stainless steel and 2¼ Cr-1 Mo steel.

24. The reformer tube assembly of claim 23 wherein the outer perimeter of the metal liner tube is sealed to the middle tube sheet with a weld.

25. The reformer tube assembly of claim 22 further comprising a contained outlet chamber above the upper tube sheet, said chamber being in flow communication with the interior of the centrally disposed metal tubes from which product gases emerge and a product gas outlet means on a reformer reactor to which the reformer tube assembly is fitted from which product gases exit the reformer reactor wherein the means to support the metal liner tube comprises a middle tube sheet sealed about the outer perimeter of the metal liner tube whereby a contained inlet chamber between the middle tube sheet and the upper tube sheet, said chamber being in flow communication with feed gas inlet means of the reformer reactor and the annulus between the metal liner tube and the centrally disposed metal tube.

26. The reformer tube assembly of claim 25 wherein the upper tube sheet and the middle tube sheet are separated by a distance of from about 3 to about 6 feet.

27. The reformer tube assembly of claim 1 wherein the means of support of the ceramic tube is a lower tube sheet.

28. The reformer tube assembly of claim 27 wherein the lower tube sheet is made of a metal taken from the group consisting of type 304H or 316H stainless steel and INCOLOY 800H.

29. The reformer tube assembly of claim 28 wherein an outer perimeter of the ceramic tube is sealed to the lower tube sheet with a ceramic/metal joint.

30. The reformer tube assembly of claim 27 further comprising a contained feed inlet chamber between the upper tube sheet and the lower tube sheet, said chamber being in flow communication with the annulus between the corrosion resistant liner and the centrally disposed metal tube and the feed gas inlet means of a reformer reactor.

31. The reformer tube assembly of claim 30 wherein the upper tube sheet and the lower tube sheet are separated by a distance of from about 3 to about 6 feet.

32. The reformer tube assembly of claim 4 wherein the means of support of the ceramic tube is a lower tube sheet.

33. The reformer tube assembly of claim 32 wherein the lower tube sheet is made of a metal taken from the group consisting of type 304H or 316H stainless steel and INCOLOY 800H.

34. The reformer tube assembly of claim 33 wherein an outer perimeter of the metal end of the ceramic tube is sealed to the lower tube sheet with a weld.

35. A convective reformer reactor having a top, a bottom and sides comprising feed gas input means, product gas outlet means, a plurality of reformer tubes cooperating with said feed gas inlet means and said product gas outlet means, means for supplying a heating medium to an exterior portion of said reformer tubes, said reformer tubes comprising a ceramic tube, a portion of which is exposed to a feed or process gas, said ceramic tube having an interior and an inner diameter, and exterior and an outer diameter, an open top end, a closed bottom end and a means for support attached adjacent to said open top end, a corrosion resistant liner, conforming to the entire portion of the ceramic tube exposed to a feed or process gas, said corrosion resistant liner having an inner diameter, an outer diameter equal to the inner diameter of the ceramic tube at operating temperature, an open top end and a closed bottom end, and a centrally disposed metal tube having an interior, an exterior, an open top end, an open bottom end and a means for support attached adjacent to the open top end of the centrally disposed metal tube wherein there is a space between the open bottom end of the centrally disposed metal tube and the bottom closed end of the corrosion resistant liner and further wherein the centrally disposed metal tube has an outer diameter less than the inner diameter of the corrosion resistant liner thereby forming an annulus therebetween for disposition of a catalyst, further wherein the means for support of the centrally disposed metal tube is an upper tube sheet sealed around an outer perimeter of the centrally disposed metal tube of each reformer tube, whereby during operation feed gas is introduced to the annulus between the corrosion resistant liner and the centrally disposed metal tube for reaction to form product gases which pass between the open bottom end of the centrally disposed metal tube and the closed bottom end of the corrosion resistant liner and are removed up through the interior of the centrally disposed metal tube into a contained outlet chamber having a top and a bottom, defined at the top by the top of the reformer reactor and the bottom by the upper tube sheet, said outlet chamber being in flow communication with the interior of the centrally disposed metal tubes from which product gases emerge and the product gas outlet of the reformer reactor from which the product gases exit the reformer reactor, the corrosion resistant liner having means for support comprising a middle tube sheet sealed about an outer perimeter of said corrosion resistant liner adjacent to said open top end of the corrosion resistant liner of each reformer tube and the means for support of the ceramic tube of each reformer tube comprises a lower tube sheet sealed about an outer perimeter of the ceramic tube of each reformer tube and further comprising a contained inlet chamber having a top, a bottom and sides, said bottom defined by the middle tube sheet, said top defined by the upper tube sheet and said sides defined by the sides of the reformer reactor, said inlet chamber being in flow communication with the feed gas inlet of the reformer reactor and the annulus between the metal liner tube and the centrally disposed metal tube.

36. A convective reformer reactor having a top, a bottom and sides comprising feed gas input means, product gas outlet means, a plurality of reformer tubes cooperating with said feed gas inlet means and said product gas outlet means, means for supplying a heating medium to an exterior portion of said reformer tubes, said reformer tubes comprising a ceramic tube, a portion of which is exposed to a feed or process gas, said ceramic tube having an interior and an inner diameter, and exterior and an outer diameter, an open top end, a closed bottom end and a means for support attached adjacent to said open end, a corrosion resistant liner, conforming to the entire portion of the ceramic tube exposed to a feed or process gas, said corrosion resistant liner having an inner diameter, an outer diameter equal to the inner diameter of the ceramic tube at operating temperature, an open top end and a closed bottom end, and a centrally disposed metal tube having an interior, an exterior, an open top end, an open bottom end and a means for support attached adjacent to the open top end of the centrally disposed metal tube wherein there is a space between the open bottom end of the centrally disposed metal tube and the bottom closed end of the corrosion resistant liner and further wherein the centrally disposed metal tube has an outer diameter less than the inner diameter of the corrosion resistant liner thereby forming an annulus therebetween for disposition of a catalyst, further wherein the means for support of the centrally disposed metal tube is an upper tube sheet sealed around an outer perimeter of the centrally disposed metal tube of each reformer tube, the corrosion resistant liner has means for support comprising a middle tube sheet sealed about an outer perimeter of said corrosion resistant liner adjacent to said open top end thereof and the means of support for the ceramic tube of each reformer tube comprising a lower tube sheet sealed about an outer perimeter of the ceramic tube of each reformer tube whereby during operation feed gas is introduced to the annulus between the corrosion resistant liner and the centrally disposed metal tube for reaction to form product gases which pass between the open bottom end of the centrally disposed metal tube and the closed bottom end of the corrosion resistant liner and are removed up through the interior of the centrally disposed metal tube and into a contained outlet chamber having a top and a bottom, said top defined by the top of the reformer reactor and said bottom defined by the upper tube sheet, said contained outlet chamber being in flow communication with the interior of the centrally disposed metal tubes from which the product gases emerge and the product gas outlet of the reformer reactor from which the product gases exit the reformer reactor and further comprising a contained inlet chamber having a bottom, a top and sides, said bottom defined by the middle tube sheet, said top defined by the upper tube sheet, and said sides defined by the sides of the reformer reactor, said contained inlet chamber being in flow communication with the feed gas inlet of the reformer reactor and the annulus between the metal liner tube and the centrally disposed metal tube.

* * * * *